US008995361B2

(12) United States Patent
Nguyen et al.

(10) Patent No.: US 8,995,361 B2
(45) Date of Patent: Mar. 31, 2015

(54) MULTI-CHANNEL, MULTI-MODULATION, MULTI-RATE COMMUNICATION WITH A RADIO TRANSCEIVER

(75) Inventors: Viet-Hung Nguyen, Saint-Mande (FR); Jerome Bartier, Montrouge (FR); Bastien Mainaud, Ris-Orangis (FR); Fabrice Monier, Bry sur Marne (FR); Daniel Popa, Paris (FR); Hartman Van Wyk, Montloius sur Loire (FR)

(73) Assignee: Itron, Inc., Liberty Lake, WA (US)

(*) Notice: Subject to any disclaimer, the term of this patent is extended or adjusted under 35 U.S.C. 154(b) by 3 days.

(21) Appl. No.: 13/366,758

(22) Filed: Feb. 6, 2012

(65) Prior Publication Data
US 2013/0121263 A1 May 16, 2013

Related U.S. Application Data

(63) Continuation of application No. PCT/US2012/023016, filed on Jan. 27, 2012.

(30) Foreign Application Priority Data

Nov. 11, 2011 (EP) .................................... 11188908

(51) Int. Cl.
*H04W 4/00* (2009.01)
*H04W 72/04* (2009.01)

(52) U.S. Cl.
CPC ................................ *H04W 72/0406* (2013.01)
USPC ......................................... 370/329; 370/254

(58) Field of Classification Search
CPC .......... H04W 72/0406; H04W 72/082; H04W 74/002; H04W 72/02; H04W 28/18; H04W 28/16; H04W 24/02; H04L 65/00; H04L 69/24

USPC ......... 370/235, 237, 341, 342, 343, 344, 345, 370/346, 347, 348, 437, 465, 468, 329
See application file for complete search history.

(56) References Cited

U.S. PATENT DOCUMENTS 6,038,225 A * 3/2000 Nago ............................ 370/343
6,914,950 B1 7/2005 Luneau
(Continued)

FOREIGN PATENT DOCUMENTS

| EP | 2228933 | 9/2010 |
|---|---|---|
| WO | WO-2010/072624 A1 * | 7/2010 |
| WO | WO2010072624 | 7/2010 |

OTHER PUBLICATIONS

PCT Search Report mailed Oct. 31, 2012 for PCT application No. PCT/US12/23016, 8 pages.
(Continued)

*Primary Examiner* — Paul H Masur
*Assistant Examiner* — Michael Phillips
(74) *Attorney, Agent, or Firm* — Lee & Hayes, PLLC (57) ABSTRACT

Techniques for communicating via a control channel, determining a particular data channel based on the communicating, and transferring data via the particular data channel are described. One or more messages are communicated via the control channel between first and second nodes. The one or more messages may indicate a particular data channel from multiple data channels that may be utilized to transfer data between the first and second nodes. The one or more messages may also indicate a modulation technique and/or data rate that may be implemented on the particular data channel. The one or more messages may be utilized to determine the particular data channel that will be utilized to transfer the data. The first and second nodes may switch to the particular data channel based on the determination and transfer the data via the particular data channel.

20 Claims, 7 Drawing Sheets

(56) References Cited

U.S. PATENT DOCUMENTS

| | | | |
|---|---|---|---|
| 7,391,711 B2* | 6/2008 | Geile et al. | 370/204 |
| 7,583,197 B2 | 9/2009 | Wesby Van Swaay | |
| 7,796,571 B2* | 9/2010 | Kishida | 370/338 |
| 7,876,786 B2* | 1/2011 | Bahl et al. | 370/478 |
| 7,924,764 B2 | 4/2011 | Moorti et al. | |
| 8,023,530 B1* | 9/2011 | Giallorenzi et al. | 370/469 |
| 8,036,168 B2* | 10/2011 | Strutt et al. | 370/329 |
| 8,094,010 B2 | 1/2012 | Wesby-van Swaay | |
| 2002/0073250 A1* | 6/2002 | Van Ommering | 710/15 |
| 2002/0085516 A1* | 7/2002 | Bridgelall | 370/329 |
| 2002/0105943 A1* | 8/2002 | Womack et al. | 370/352 |
| 2003/0202500 A1* | 10/2003 | Ha et al. | 370/342 |
| 2003/0212827 A1* | 11/2003 | Saha et al. | 709/247 |
| 2004/0001429 A1* | 1/2004 | Ma et al. | 370/210 |
| 2004/0013102 A1* | 1/2004 | Fong et al. | 370/345 |
| 2004/0137906 A1* | 7/2004 | Nakao et al. | 455/450 |
| 2004/0192219 A1 | 9/2004 | Malone et al. | |
| 2005/0227624 A1* | 10/2005 | Hiddink et al. | 455/62 |
| 2006/0105764 A1* | 5/2006 | Krishnaswamy et al. | 455/424 |
| 2006/0119494 A1* | 6/2006 | Na et al. | 341/143 |
| 2006/0193339 A1* | 8/2006 | Wang et al. | 370/465 |
| 2006/0268983 A1* | 11/2006 | Kwon et al. | 375/240.11 |
| 2007/0002742 A1* | 1/2007 | Krishnaswamy et al. | 370/235 |
| 2008/0002676 A1* | 1/2008 | Wiley et al. | 370/356 |
| 2008/0040509 A1* | 2/2008 | Werb et al. | 709/242 |
| 2008/0089390 A1 | 4/2008 | Picard | |
| 2008/0102845 A1* | 5/2008 | Zhao | 455/450 |
| 2008/0144493 A1* | 6/2008 | Yeh | 370/230 |
| 2008/0153425 A1 | 6/2008 | Heo et al. | |
| 2008/0176586 A1* | 7/2008 | George et al. | 455/466 |
| 2008/0198902 A1* | 8/2008 | Malladi | 375/134 |
| 2009/0154485 A1 | 6/2009 | Park et al. | |
| 2009/0257374 A1* | 10/2009 | Cho et al. | 370/328 |
| 2009/0258603 A1* | 10/2009 | Ghaboosi et al. | 455/68 |
| 2009/0303888 A1* | 12/2009 | Ariyur et al. | 370/252 |
| 2010/0027517 A1* | 2/2010 | Bonta et al. | 370/338 |
| 2010/0195575 A1 | 8/2010 | Papasakellariou et al. | |
| 2010/0232369 A1* | 9/2010 | Jing et al. | 370/329 |
| 2010/0246541 A9* | 9/2010 | Kim | 370/338 |
| 2010/0316159 A1* | 12/2010 | Bo et al. | 375/295 |
| 2011/0032821 A1* | 2/2011 | Morrill et al. | 370/230 |
| 2011/0069672 A1* | 3/2011 | Lee et al. | 370/330 |
| 2011/0142025 A1* | 6/2011 | Agee et al. | 370/342 |
| 2011/0182326 A1 | 7/2011 | Picard | |
| 2011/0261764 A1* | 10/2011 | Shirakata et al. | 370/329 |
| 2012/0020312 A1* | 1/2012 | Lv et al. | 370/329 |
| 2012/0063337 A1 | 3/2012 | Shukla | |

OTHER PUBLICATIONS

Freaklabs—Open Source Wireless, IEEE 802.15.4 in the context of Zigbee—Part 2, Dec. 14, 2008, 8 pages.

Wireless Medium Access Control, IEEE 802.15.4, Speaker Chun-Yi Chen, Sep. 7, 2007, 40 pages.

Extended European Search Report mailed Jan. 24, 2012 for European patent application No. 11188908.5, 6 pages.

European Office Action mailed Dec. 4, 2013 for European patent application No. 11188908.5, a counterpart foreign application of U.S. Appl. No. 13/366,758, 4 pages.

European Office Action mailed Oct. 17, 2014 for European patent application No. 11188908.5, a counterpart foreign application of U.S. Appl. No. 13/366,758, 4 pages.

* cited by examiner

MULTI-CHANNEL, MULTI-MODULATION, MULTI-RATE COMMUNICATION WITH A RADIO TRANSCEIVER

RELATED APPLICATIONS

This application is a continuation of, and claims priority to, PCT International Application No. PCT/US12/23016, filed Jan. 27, 2012, which claims foreign priority to European Application No. 11188908.5, filed on Nov. 11, 2011, both of which are incorporated herein by reference.

BACKGROUND

Wireless networks are configured for many purposes. They may be configured in small areas, such as a residence, or larger areas such as an enterprise-wide network. In some cases, wireless networks extend over entire cities, states, continents, and the globe.

Generally, wireless networks include a plurality of nodes which communicate with each other on a same wireless channel (e.g., a predefined frequency range). The communication often includes transferring (e.g., transmitting) large amounts of data between two or more nodes. In some instances, two or more of the plurality of nodes wish to communicate on the channel at a same time.

In these networks, one or more of the plurality of nodes are often forced to wait to communicate on the network. For example, due to a limited channel number, a node may be forced to transfer data after another node finishes communicating on the channel. This waiting period may be lengthened when the other node is transferring a large amount of data which requires more communication time.

There is an increasing opportunity to transfer data in a wireless network in an efficient manner.

BRIEF DESCRIPTION OF THE DRAWINGS

The detailed description refers to the accompanying figures. In the figures, the left-most digit(s) of a reference number identifies the figure in which the reference number first appears. The use of the same reference numbers in different figures indicates similar or identical items.

DETAILED DESCRIPTION

This disclosure describes techniques for transferring (e.g., transmitting) data over a network having multiple nodes, including at least first and second nodes. In particular implementations, the techniques may be implemented in a multi-channel network in which a physical channel is divided into a control channel and multiple data channels. The first and second nodes may communicate one or more messages via the control channel that indicate a particular data channel from the multiple data channels that may be utilized to transfer data between the first and second nodes. The one or more messages may also indicate a modulation technique and/or a data rate that may be utilized when the data is transferred. In some cases, each of the one or more messages is shorter in length than the data (i.e., each of the one or more messages includes less bits and/or bytes than the data).

The first node and/or second node may determine the particular data channel that will be utilized to transfer data based at least in part on the one or more messages. The first node and/or second node may also determine the modulation technique and/or data rate that will be utilized. The first node and/or second node may switch to the particular data channel based on the determination. The first node may then send the data to the second node via the particular data channel. In some cases, the data is sent via the particular data channel based at least in part on the determined modulation technique and/or data rate. The first node and/or second node may switch back to the control channel after the data has been transferred. In some instances, the first node and/or second node each include a single radio frequency transceiver configured to implement a plurality of different modulation techniques and/or data rates.

The techniques described herein may allow data to be transferred in an efficient manner. For example, by specifying a control channel and multiple data channels, nodes may communicate via the control channel while other nodes transfer data via a data channel. In addition, by specifying multiple data channels, a first set of nodes may transfer data via a first data channel while a second set of nodes transfer data via a second data channel. This may allow a network to increase data throughput compared to techniques which utilize a single channel. Moreover, in some instances, a node may communicate via a single radio frequency transceiver configured to implement a plurality of different modulation techniques and/or data rates. Further, by communicating short messages on a control channel and transferring long data on a data channel, more nodes may communicate via the control channel compared to techniques which utilize a single channel for communicating short messages and long data.

The sections below are examples provided for the reader's convenience and are not intended to limit the scope of the claims, nor the proceeding sections. Furthermore, the techniques described in detail below may be implemented in a number of ways and in a number of contexts. One example implementation and context is provided with reference to the following figures, as described below in more detail. However, the following implementation and context is but one of many.

Illustrative Architecture

Figure 1:
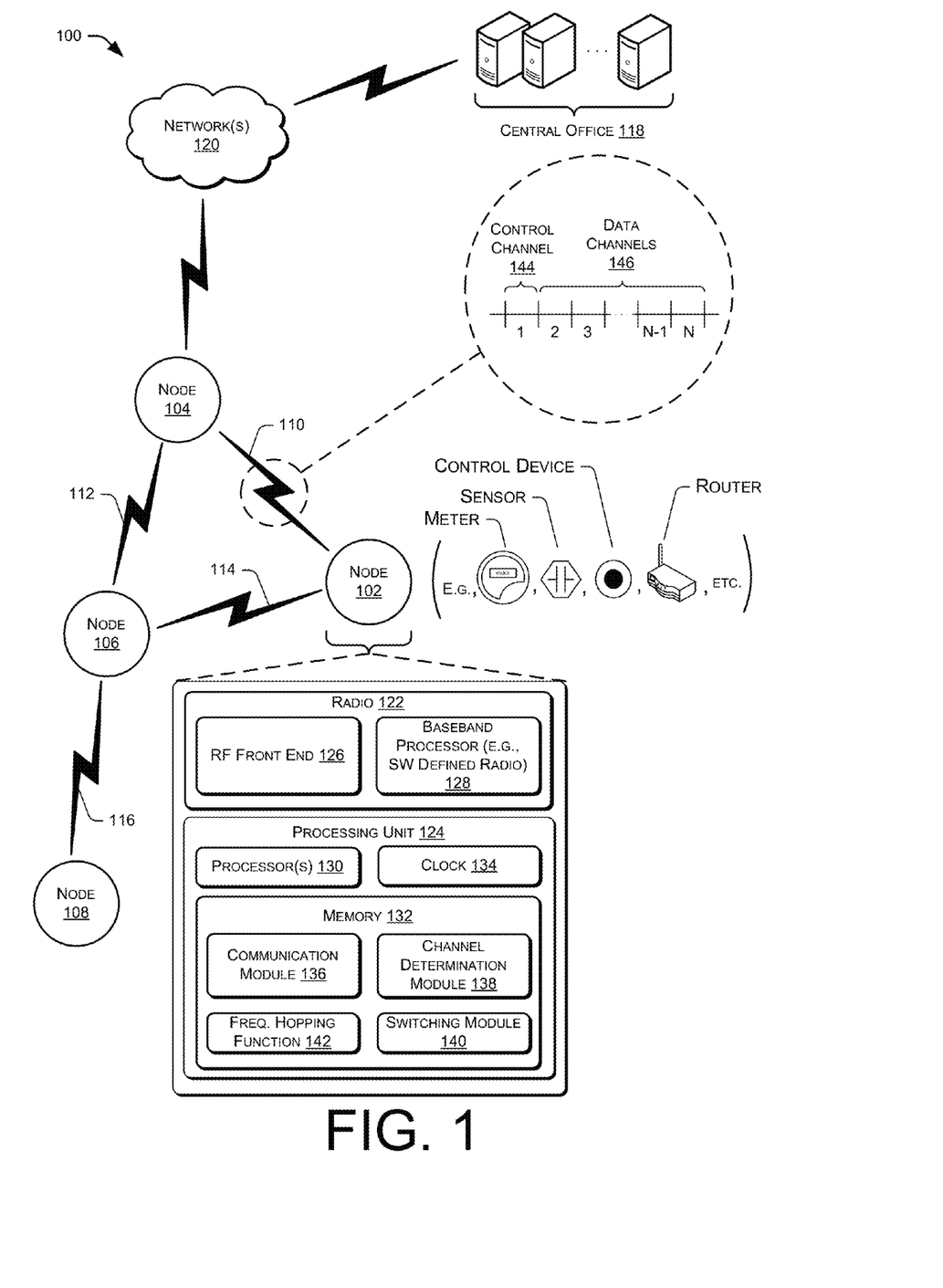
FIG. 1 illustrates an exemplary architecture in which techniques described herein may be implemented.

FIG. 1 illustrates an exemplary architecture 100 in which techniques described herein may be implemented. The architecture 100 includes a plurality of nodes 102-108 communicatively coupled to each other via communication paths 110-116. Here, the nodes 102-108 are also configured to communicate with a central office 118 via a network(s) 120.

Each of the nodes 102-108 may be implemented as any one of a variety of conventional computing devices such as, for example, smart utility meters (e.g., electric, gas, and/or water meters equipped with two-way communications), sensors (e.g., temperature sensors, weather stations, frequency sensors, etc.), control devices, routers, regulators, servers, relays, switches, valves, or a combination thereof. In some instances, the nodes 102-108 form part of one or more networks, such as Autonomous Routing Area (ARA) networks, such as a Local Area Network (LAN), Personal Area Network (PAN), Home Area Network (HAN), Neighborhood Area Network (NAN), Wide Area Network (WAN), Metropolitan Area Network (MAN), etc. Further, in some aspects of this disclosure, the nodes 102-108 are implemented in a mesh networking environment where the nodes 102-108 transfer data between each other.

The node 102 is representative of each of the nodes 102-108 and includes a radio 122 and a processing unit 124. The radio 122 may comprise a radio frequency (RF) transceiver configured to transmit and/or receive RF signals via one or more of a plurality of channels. In some instances, the radio 122 may implement one or more of a plurality of different modulation techniques, data rates (i.e., bit rates), protocols, signal strengths, and/or power levels. In some implementations, the radio 122 comprises a single RF transceiver configured to implement a plurality of different modulation techniques, data rates, protocols, signal strengths, and/or power levels.

Further, in some implementations, the radio 122 utilizes a modulation technique and/or data rate associated with a previously defined standard. In some instances, the modulation technique and/or data rate are associated with a standard defined by the Institute of Electrical and Electronics Engineering (IEEE), such as the IEEE 802.11 standard, the IEEE 802.15 standard, etc. In one example, the modulation technique and/or data rate are selected from the following non-exhaustive list:

Frequency Shift Keying (FSK) modulation with a data rate of 50 or 150 kbps; channel spacing of 200 or 400 kHz; and/or a first channel starting at 902.2 or 902.4 MHz. FSK modulation may utilize convolutional code forward error correction (FEC).

Orthogonal Frequency-Division Multiplexing (OFDM) with physical modulations of binary phase-shift keying (BPSK), quadrature phase-shift keying (QPSK), and/or quadrature amplitude modulation (QAM) (e.g., 16-QAM); a data rate of 50, 100, 200, 300, 400, 600, or 800 kbps; and/or channel spacing of 400 or 800 kHz. OFDM may utilize convolutional FEC with ½ or ¾ coding rate.

Direct-sequence spread spectrum (DSSS) modulation with a physical modulation of offset quadrature phase-shift keying (O-QPSK); a data rate of 31.25, 125, 250, or 500 kbps; and/or channel design based on a previously defined standard, such as the 802.15.4 standard. DSSS may utilize convolutional FEC.

Moreover, in further implementations, the radio 122 may utilize a customized modulation technique. In one example, the customized modulation technique is associated with a data rate of 6 or 10 kbps.

The radio 122 includes an antenna (not illustrated in FIG. 1) providing input to an RF front end 126. The RF front end 126 may provide transmitting and/or receiving functions. The RF front end 126 may include high-frequency analog and/or hardware components that provide functionality, such as tuning and/or attenuating signals provided by the antenna and obtained from one or more of the nodes 104-108. The RF front end 126 may provide a signal to a baseband processor 128.

All or part of the baseband processor 128 may be configured as a software (SW) defined radio. In one example, the baseband processor 128 provides frequency and/or channel selection functionality to the radio 122. The SW defined radio may include components that might alternatively be implemented using analog components. For example, the SW defined radio may include mixers, filters, amplifiers, modulators and/or demodulators, detectors, etc., implemented in software executed by a processor or application specific integrated circuit (ASIC) or other embedded computing device(s). The SW defined radio may utilize a processor(s) 130 and software defined or stored in memory 132.

Meanwhile, the processing unit 124 may include the processor(s) 130 communicatively coupled to the memory 132. The processing unit 124 may also include a clock 134 configured to maintain a time. The clock 134 may also be configured to provide one or more count-up or count-down timers. Such timers may be used in frequency hopping a control and/or data channel.

The memory 132 may be configured to store one or more software and/or firmware modules, which are executable on the processor(s) 130 to implement various functionalities. While the modules are described herein as being software and/or firmware executable on a processor, in other embodiments, any or all of the modules may be implemented in whole or in part by hardware (e.g., as an ASIC, a specialized processing unit, etc.) which execute the described functions or instructions.

In the embodiment of FIG. 1, the memory 132 includes a communication module 136, a channel determination module 138, and a switching module 140. The communication module 136 may cause one or more messages and/or data to be sent and/or received via a channel, such as a data or control channel. The channel determination module 138 may determine the channel to be utilized for sending and/or receiving the one or more messages and/or data. The switching module 140 may cause the channel to be switched. The memory 132 may also include a frequency hopping function 142 utilized during frequency hopping of a channel, such as a data channel or control channel.

The memory 132 may comprise computer-readable media and may take the form of volatile memory, such as random access memory (RAM) and/or non-volatile memory, such as read only memory (ROM) or flash memory. Computer-readable media includes volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include communication media, such as modulated data signals and carrier waves.

In some implementations, information (e.g., a message, data, etc.) is transferred in the architecture 100 by means of a protocol data unit (PDU). A PDU may be based at least in concept on, for example, the Open Systems Interconnection (OSI) Model and may comprise, for example, a bit, a frame, a packet, a segment, etc. In some instances, one or more layers of the OSI model are utilized to transfer one or more PDUs between nodes. For example, the data link layer of the OSI model may be utilized to transfer PDUs between two or more of the nodes 102-108 in the architecture 100. In particular implementations, the media access control (MAC) sub-layer of the data link layer is utilized to transfer PDUs between two or more of the nodes 102-108. Further, in some implementations, an access method may be utilized to transfer PDUs, such as the carrier sense multiple access with collision avoidance (CSMA/CA) method, for example.

For ease of illustration, the following description will refer to transferring information in the context of transferring PDUs. As used herein, the term "message PDU" generally refers to a PDU associated with controlling and/or commanding the transfer of data. The message PDU may specify, for example, a data channel that may be utilized to transfer the data, a modulation technique that may be utilized on the data channel, and/or a data rate that may be utilized on the data channel. In some instances, the message PDU may be associated with an IEEE standard (e.g., IEEE 802.11, 802.15.4, etc.). Here, the message PDU may comprise, for example, a Request-to-Send (RTS) PDU, a Clear-to-Send (CTS) PDU, a Non-Clear-to-Send (NCTS) PDU, etc.

Meanwhile, the term "data PDU" is used herein to generally refer to a PDU associated with data that is transferred. For example, a data PDU may include data that is generated at and/or provided to a node to be transferred to another node. In some instances, a data PDU may be associated with an IEEE standard (e.g., IEEE 802.11, 802.15.4, etc.). Here, the data PDU may comprise, for example, Unicast Data and/or Broadcast Data. In some instances, a data PDU may include the same or similar information that is included in a message PDU.

A message PDU generally operates in combination with a data PDU. For instance, a message PDU may be transferred on a control channel to request that a data PDU be transferred on a data channel. In some instances, a data PDU is transferred on a data channel when a message PDU is shorter in length than the data PDU. That is, the message PDU includes less bits and/or bytes than the data PDU. In other instances, a data PDU is transferred on a control channel when a message PDU is equal or longer in length than the data PDU. Here, the data PDU may be transferred without transferring a message PDU.

In FIG. 1, the communication path 110 is representative of the communication paths 112-116 and includes a plurality of channels labeled 1-N. Each of the plurality of channels may be defined by a frequency range which is the same or different for each of the plurality of channels. In some instances, the plurality of channels comprises RF channels. As illustrated, the plurality of channels may comprise a control channel 144 and multiple data channels 146. In some instances, the control channel 144 is utilized for communicating one or more message PDUs between nodes to specify one of the data channels 146 to be utilized to transfer one or more data PDUs. Meanwhile, the data channels 146 may be utilized to transfer the one or more data PDUs between the nodes.

In some implementations, each of the nodes 102-108 divides the communication path 110 into the control channel 144 and the multiple data channels 146. For example, the MAC sub-layer implemented in of each of the nodes 102-108 may divide a total number of physical RF channels of the communication path 110 into the control channel 144 and the multiple data channels 146.

The network(s) 120, meanwhile, may comprise a wireless or a wired network, or a combination thereof. The network(s) 120 may be a collection of individual networks interconnected with each other and functioning as a single large network (e.g., the Internet or an intranet). Examples of such individual networks include, but are not limited to, PANs, HANs, LANs, WANs, and MANs. Further, the individual networks may be wireless or wired networks, or a combination thereof.

The central office 118 may be implemented by one or more computing devices, such as servers, personal computers, laptop computers, etc. The one or more computing devices may be equipped with one or more processor(s) communicatively coupled to memory. In some examples, the central office 118 includes a centralized meter data management system which performs processing, analysis, storage, and/or management of data received from one or more of the nodes 102-108. For instance, the central office 118 may process, analyze, store, and/or manage data obtained from a smart utility meter, sensor, control device, router, regulator, server, relay, switch, valve, and/or other nodes. Although the example of FIG. 1 illustrates the central office 118 in a single location, in some examples the central office 118 may distributed amongst multiple locations and/or may be eliminated entirely (e.g., in the case of a highly decentralized distributed computing platform).

Figure 2:
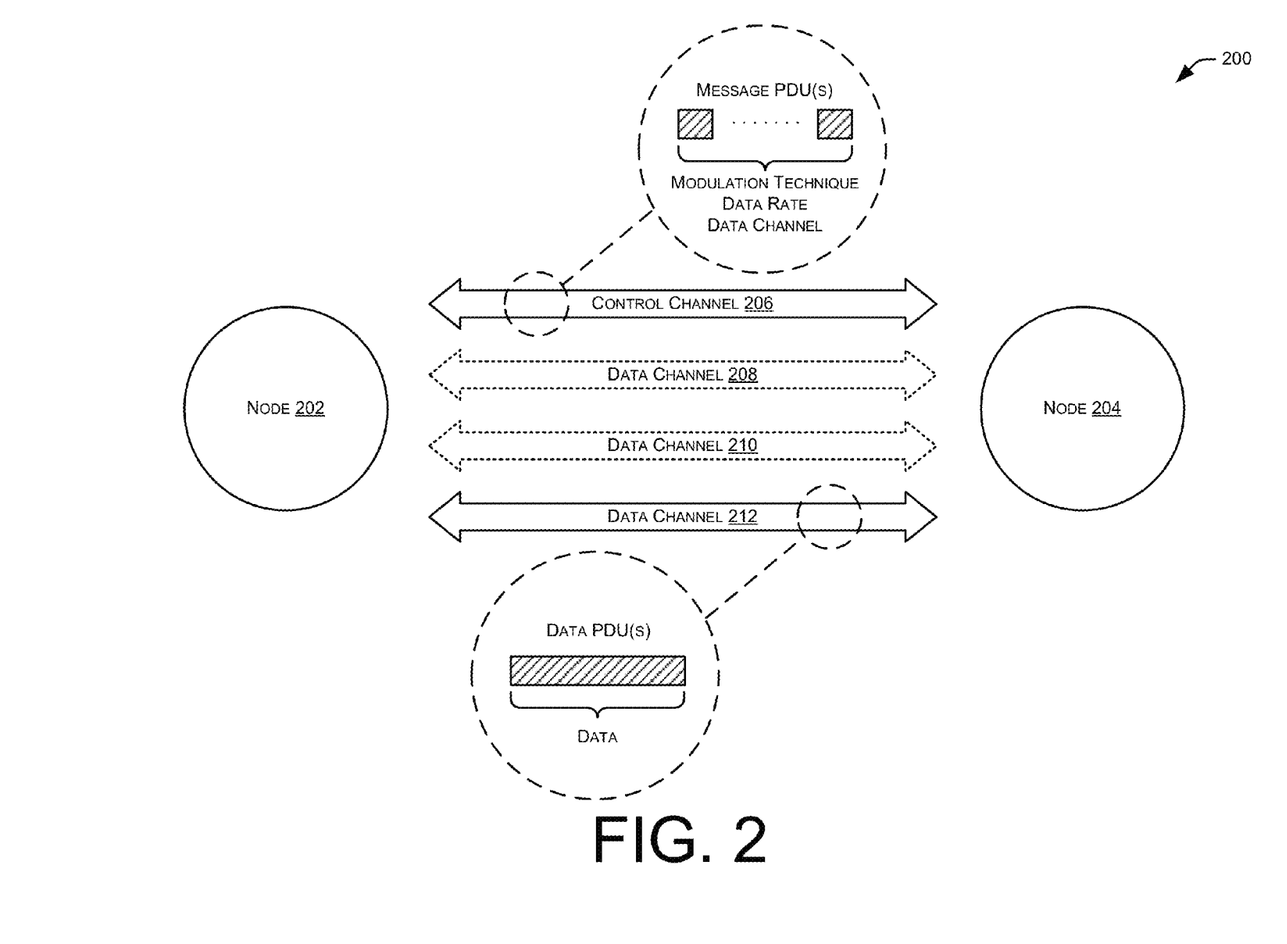
FIG. 2 illustrates an exemplary control channel and exemplary data channels that may be utilized to transfer data between nodes of a network.

FIG. 2 illustrates an exemplary environment 200 for transferring one or more message PDU(s) and/or data PDU(s) between a first node 202 and a second node 204. The first and second nodes 202 and 204 may be similar to or the same as the nodes 102-108 in FIG. 1. Here, the first node 202 and/or second node 204 may transfer the one or more message PDU(s) and/or data PDU(s) via a control channel 206 and/or data channels 208-212.

In one example, the first node 202 and/or second node 204 listen to the control channel 206 for a message PDU that requests the first node 202 and/or second node 204 to exchange information (e.g., a message PDU, a data PDU, etc.). The first node 202 and/or second node 204 may listen to the control channel 206 by tuning to a frequency associated with the control channel 206. The control channel 206 may be static or hop according to a predefined frequency hopping pattern.

When the first node 202, for example, wishes to transfer a data PDU to the second node 204, the first node 202 may send a first message PDU to the second node 204 via the control channel 206. The first message PDU may indicate a request to send a data PDU from the first node 202 to the second node 204. The first message PDU may comprise, for example, an RTS PDU. In response, the second node 204 may send a second message PDU to the first node 202 via the control channel 206 indicating that the first node 202 may send the data PDU to the second node 204. The second message may comprise, for example, a CTS PDU.

In some instances, the first node 202 may send the first message PDU multiple times. Here, the first node 202 may send the first message PDU based on a first modulation technique. If a response (e.g., the second message PDU) from the second node 204 is not received within a predetermined time period, then the first node 202 may send the first message PDU again based on a second modulation technique (e.g., a modulation technique different than the first modulation technique) and/or different channel and/or different data rate. This process may be repeated any number of times until a response is received from the second node 204. By doing so, the first node 202 may utilize different advantages of different modulation techniques.

In some aspects of this disclosure, the first modulation technique is associated with a different connectivity range, signal strength, signal-to-noise ratio, power level, data rate, etc. The connectivity range may refer to a distance at which a signal may be received. In some implementations, the second modulation technique is associated with a connectivity range that is greater than a connectivity range associated with the first modulation technique. Further, in some implementations, the second modulation technique is associated with a data rate that is less than a data rate associated with the first modulation technique.

Alternatively, or additionally, the first modulation technique and/or second modulation technique may include predefined techniques. To illustrate, the first modulation technique may utilize, for example, FSK modulation, while the second modulation technique may utilize OFDM or DSSS.

Meanwhile, the first message PDU and/or second message PDU may specify a particular data channel from the multiple data channels 208-212 that may be utilized to transfer a data PDU. The first message PDU and/or second message PDU may also specify a modulation technique and/or data rate that may be utilized on the particular data channel while transferring the data PDU. Further, the first message PDU and/or second message PDU may specify a number of data PDUs that may be transferred on the particular data channel.

In some implementations, the first message PDU and/or second message PDU specifies capabilities of one or more of the nodes 202 and 204. The capabilities may include, for example, a maximum, minimum, preferred, and/or range of data channels, modulation techniques, and/or data rates. The capabilities may differ because of, for example, different device types (e.g., meter vs. cell router), generation of a device, model of a device, etc. To illustrate, the first node 202 may send a first message PDU that indicates that the first node 202 includes hardware and/or software resources to transmit and/or receive a data PDU at a particular data rate and/or with a particular modulation technique. The first message PDU may additionally, or alternatively, specify a preferred data channel from the multiple data channels 208-212 and/or a list of available data channels.

Based on the first message PDU and/or second message PDU, the first node 202 and/or second node 204 may determine a particular data channel that will be utilized to transfer a data PDU, a modulation technique that will be utilized on the particular data channel, and/or a data rate that will be utilized on the particular data channel. In some examples, the second node 204 may perform the determination after the second node 204 receives a message PDU from the first node 202, while in other examples the first node 202 may perform the determination.

In some instances, a particular data channel is determined based on a plurality of data channels that may be available to the first node 202 and/or second node 204. In one implementation, the second node 204 receives a first message PDU including a list of data channels that are available. Here, the second node 204 may select a particular data channel from the list and send a second message PDU to the first node 202 indicating that the particular data channel has been selected to transfer a data PDU.

Alternatively, or additionally, a particular data channel may be determined based on a preferred data channel specified in, for example, the first message PDU and/or second message PDU. In one implementation, the second node 204 receives a first message PDU from the first node 202 indicating a preferred data channel. Here, the second node 204 may select the preferred data channel and send a second message PDU to the first node 202 indicating that the preferred data channel has been selected. In the example of FIG. 2, the data channel 212 represents the particular data channel that is determined for transferring the data PDU.

In some instances, a particular data channel, modulation technique, and/or data rate may be determined based on capabilities of the first node 202 and/or second node 204. For example, if the second node 204 receives a message PDU from the first node 202 that indicates capabilities of the first node 202, then the second node 204 may compare these capabilities with capabilities of the second node 204. Based on the comparison, the second node 204 may determine, for example, a modulation technique and/or data rate that is common to the first node 202 and second node 204. That is, the comparison may identify the modulation technique and/or data rate that may be supported by hardware and/or software resources of the first node 202 and second node 204.

In some implementations, a determined data rate may be a maximum common data rate from among a plurality of data rates that may be supported by the first node 202 and second node 204. Alternatively, or additionally, the determined data rate may be a rate that is proposed in the first message PDU and/or second message PDU. Meanwhile, the determined modulation technique may be a common modulation technique which is associated with, for example, a maximum data rate and/or maximum connectivity range from among a plurality of modulation techniques that may be implemented by the first node 202 and second node 204.

In some instances, the determined modulation technique and/or data rate are different than those which are utilized on the control channel, while in other instances the determined modulation technique and/or data rate are the same. For example, the determined modulation technique may be a technique which provides a longer or shorter connectivity range than the modulation technique utilized on the control channel. Meanwhile, the determined data rate may be greater than, equal to, or less than a data rate implemented on the control channel. In some instances, the determined modulation technique and/or data rate may be one that is less susceptible to interference than other modulation techniques and/or data rates available to the first and second nodes 202 and 204.

Further, in some instances, the determined modulation technique and/or data rate may be based on a distance between the first and second nodes 202 and 204. For example, if the distance is greater than a threshold, then a particular modulation technique and/or data rate may be selected that is more suited for communicating a signal a long distance (e.g., a distance greater than the threshold).

After a particular data channel, modulation technique, and/or data rate are determined, the first node 202 and/or second node 204 may switch from the control channel 206 to the particular data channel. The first node 202 and/or second node 204 may switch by tuning to a frequency associated with the particular data channel. As noted above, the data channel 212 in FIG. 2 represents the particular data channel that is determined.

The first node 202 and second node 204 may then transfer a data PDU via the particular data channel. Here, the first node 202, for example, may send a data PDU to the second node 204 via the data channel 212. In some examples, the first node 202 and second node 204 transfer the data PDU based on the modulation technique and/or data rate determined from the first message PDU and/or second message PDU. As noted above, the data PDU may be, in some instances, transferred via the particular data channel when the data PDU is longer in length than the first message PDU and/or second message PDU transferred on the control channel 206.

After the data PDU has been transferred, the first node 202 and/or second node 204 may switch from the data channel 212 to the control channel 206. In some instances, the first node 202 and/or second node 204 switch in response to receiving or sending an acknowledgment PDU indicating that the data PDU was received. The acknowledgement PDU may comprise, for example, an Acknowledgement (ACK) signal defined in an IEEE standard, such as the IEEE 802.15.4 standard. The acknowledgement PDU may be sent via the data channel 212. In other instances, the first node 202 and/or second node 204 may switch to the control channel 206 after a predetermined time has passed since the data PDU was received and/or sent.

As discussed above, in some implementations, the first node 202 and/or second node 204 are each equipped with an RF transceiver configured to implement a plurality of different modulation techniques, data rates, protocols, signal strengths, and/or power levels. In particular implementations, each RF transceiver comprises a single RF transceiver.

Meanwhile, in some cases, while the nodes 202 and 204 utilize the data channel 212, other nodes may utilize the control channel 206 and/or one of the other data channels 208-210. That is, while the nodes 202 and 204 transfer the data PDU on the data channel 212, two or more other nodes may specify a particular data channel via the control channel 206 and switch to the particular data channel to transfer data. The particular data channel may be a different data channel than that utilized by the first and second nodes 202 and 204, such as the data channel 208 or 210. This may allow multiple nodes on a network to utilize a common control channel. Further, this may allow first nodes to transfer data on a first data channel while second nodes simultaneously/concurrently transfer data on a second data channel. In some cases, this may increase data throughput of the network in comparison to networks which do not utilize a control channel and/or multiple data channels, such as networks with a single channel.

Further, in instances where a data PDU is longer in length than a first message PDU and/or second message PDU, a common control channel may be utilized by transferring short message PDUs on the control channel and transferring long data PDUs on one or more data channels. This may further increase data throughput of the network in comparison to networks which do not utilize a control channel and/or multiple data channels.

Although the techniques described herein illustrate transferring a PDU to one node at a time, the PDU may be alternatively, or additionally, transferred to more than one node at a time. For example, the PDU may be transferred to a plurality of nodes at the same time by, for example, broadcasting the PDU to the plurality of nodes. Here, the PDU may be broadcast via, for example, a control channel and/or a particular data channel which are previously specified to the plurality of nodes. Further, in some instances, when transferring a PDU to a single node, one or more other nodes in the vicinity of the single node may overhear (e.g., receive) the transmission.

Illustrative Frequency Hopping

Figure 3:
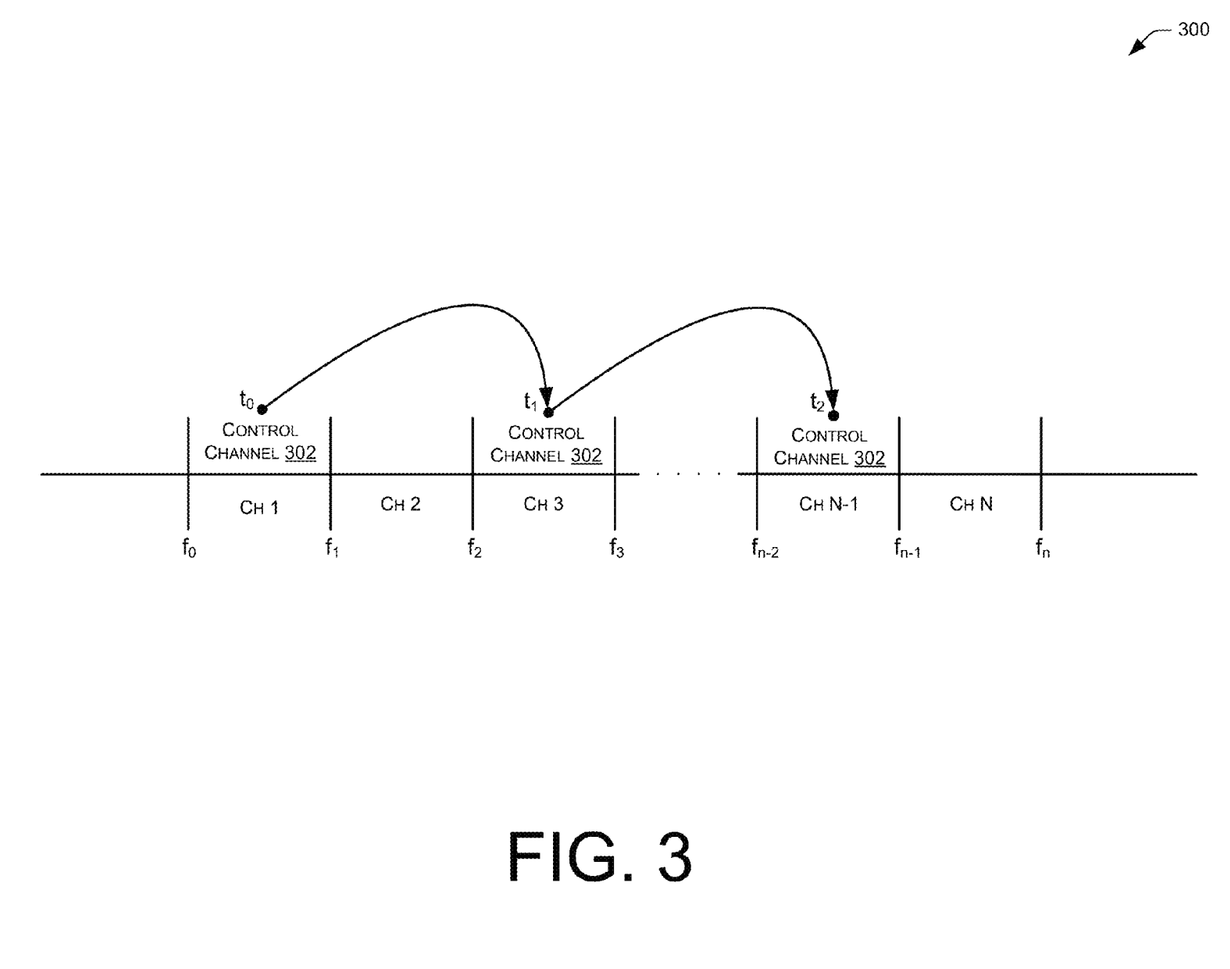
FIG. 3 illustrates an exemplary frequency hopping process to frequency hop a control channel over a plurality of channels.

FIG. 3 illustrates an exemplary frequency hopping process 300 to frequency hop a control channel 302 over a plurality of channels. As illustrated, the control channel 302 is hopped over channels 1-N such that the control channel 302 is located at a channel 1 at a time $t_0$, a channel 3 at a time $t_1$, and at a channel N−1 at a time $t_2$. The channels 1-N are each defined by a frequency range. For instance, the channel 1 is defined between a frequency $f_0$ and $f_1$.

The frequency hopping may be associated with a frequency hopping sequence. This sequence may be transmitted to one or more nodes of a network that may utilize the channels 1-N. In some instances, the sequence is transmitted from a particular node in the network that will initiate the frequency hopping. The particular node may comprise, for example, a coordinator of the network, such as a PAN coordinator.

In some instances, data channels of the network are also hopped over the channels 1-N as the control channel 302 is hopped. For example, when the control channel 302 is located at channel 1, the data channels may be defined from channels 2-N. Thereafter, when the control channel 302 is located at channel 3, the data channels may be defined from the channels 1, 2, and 4-N. Further, in some cases, the frequency hopping is implemented by MAC sub-layers of the nodes of the network.

In some implementation, frequency hopping may be implemented to reduce or mitigate radio interference which may affect communication on a network.

It should be appreciated that the frequency hopping illustrated in FIG. 3 is an exemplary implementation, and that the frequency hopping may be implemented in other manners and/or based on other hopping sequences. For example, although the example of FIG. 3 utilizes a hopping sequence that hops the control channel 302 from channel 1 to channel 3, and then from channel 3 to channel N−1, a different hopping sequence may be utilized to hop the control channel 302 to any of the channels 1-N in any order.

Illustrative Protocol Data Units

Figure 4:
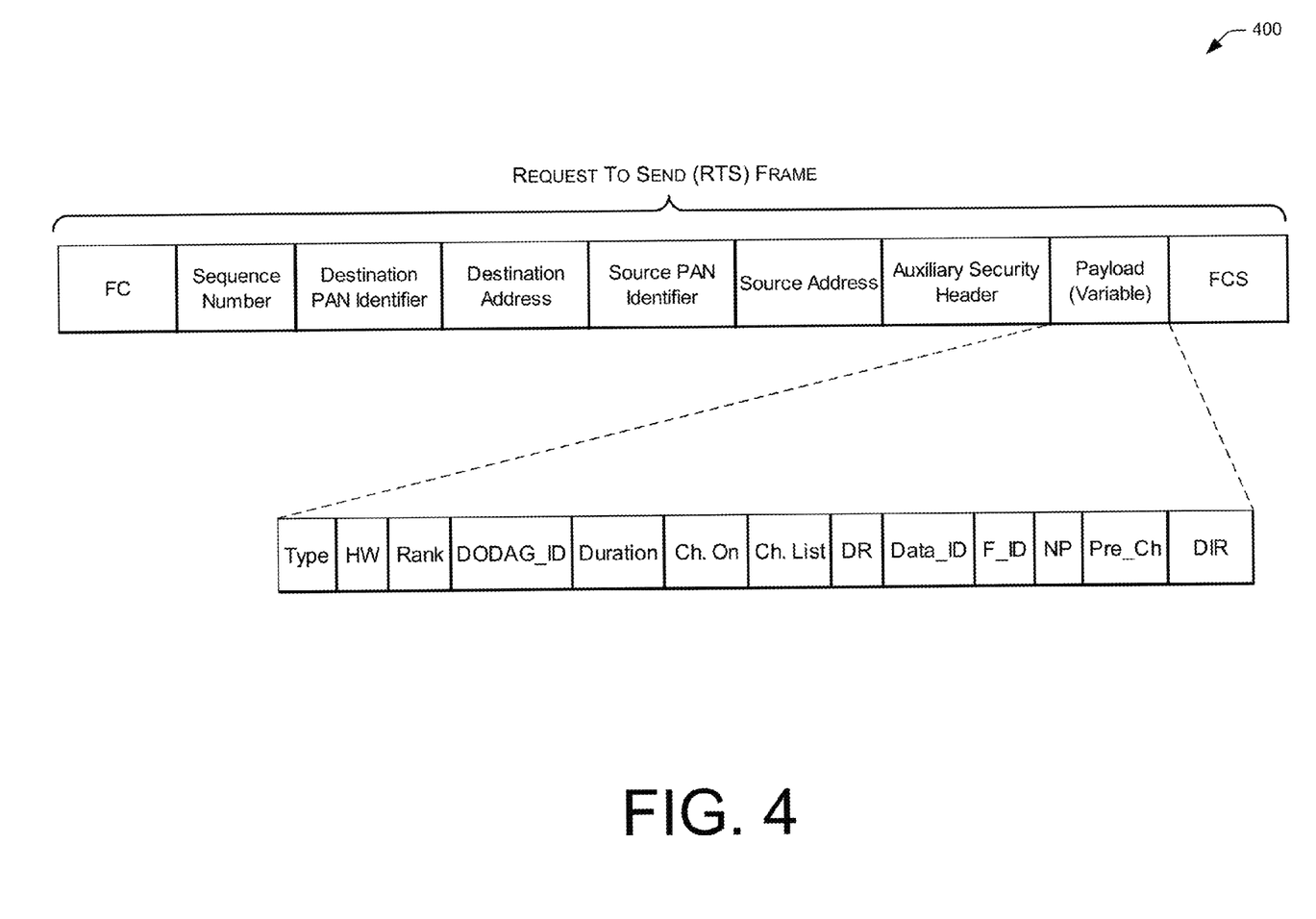
FIG. 4 illustrates an exemplary request-to-send frame that may be communicated to request to send data to a node.
Figure 5:
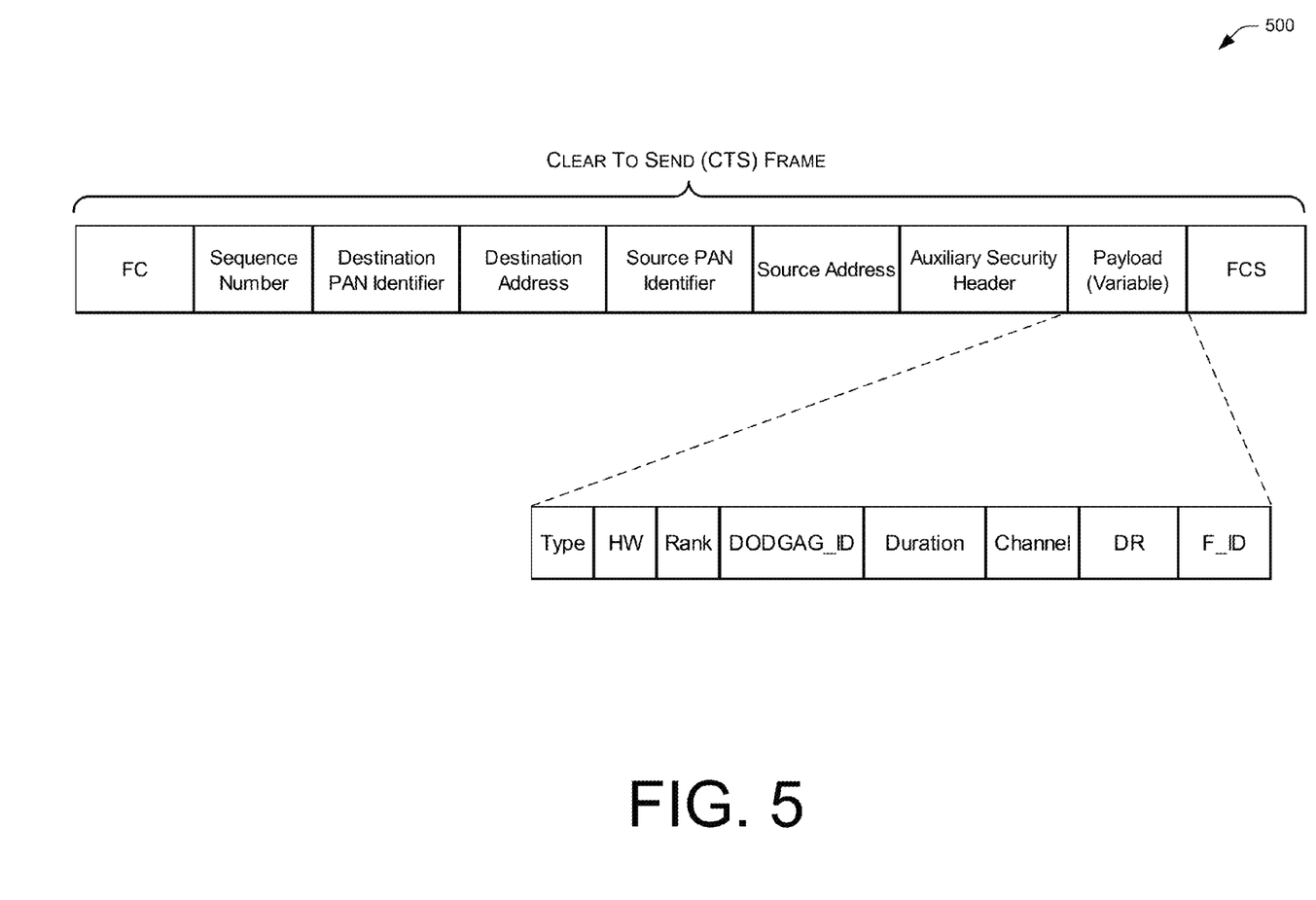
FIG. 5 illustrates an exemplary clear-to-send frame that may be communicated to indicate that data may be sent to a node.

FIGS. 4-5 illustrate exemplary PDUs which may be transferred via a control channel and/or data channel. In particular, FIG. 4 illustrates an example request-to-send (RTS) frame 400 that may be used to indicate that a node wishes to send data to another node, while FIG. 5 illustrates an example clear-to-send (CTS) frame 500 that may be used to indicate that a node is available to receive data. In some examples, upon receiving an RTS message, a node may respond (if available) by sending a CTS message. In this example, the RTS and CTS frame structures are defined by the IEEE 802.15.4 standard. However, in other examples other PDU structures may be used for the RTS messages, CTS messages, or other communications conveying information associated with a multi-channel communication network.

Referring to FIG. 4, the example RTS frame 400 may be used to inform neighboring nodes that a node wishes to send data and will not be available for another transmission, and to negotiate a particular data channel and one or more physical (PHY) parameters (e.g., data rate and/or modulation technique) with an intended recipient node. As shown in FIG. 4, the RTS frame includes the following fields: frame control (FC), sequence number, destination personal area network (PAN) identifier, destination address, source PAN identifier, source address, auxiliary security header, payload, and frame check sequence (FCS). Details of the foregoing fields of the RTS frame other than the payload are well known to those skilled in the art and are not described in detail herein. The payload of the RTS frame 400, however, is customized to implement the techniques described above, as well as other functionalities. The payload may be variable in size and may include, for example, one or more of the following fields:

Type: This field indicates a type of the frame, e.g., RTS, CTS, not-clear-to-send (NCTS), etc. In the example of FIG. 4, this field indicates that the frame is an RTS frame.

HW: This field indicates a type of hardware of a node sending the RTS frame. The type may include, for example, a version or generation of device, and/or any other information usable to determine capabilities of the node (e.g., battery powered, modulation techniques and/or data rates that are supported by the node).

Rank: This field indicates a routing protocol for low power and lossy networks (RPL) rank (if known) of the node which is sending the RTS frame. This field may be utilized by a receiving node for routing consistency detection at the MAC sub-layer.

DODAG_ID: This field is a Destination Oriented Directed Acyclic Graph (DODAG) identifier (ID), which identifies a DODAG root (e.g., a network border router, cellular router, relay, etc.), through which the node sending the RTS is connected to a backhaul network, such as the Internet, for communication with a central office or other network computing device. In the context of the architecture 100 of FIG. 1, the node 104 is an example of a DODAG root which is in communication with network(s) 120, which may comprise a backhaul network(s). The DODAG_ID allows a node which receives the RTS frame to accept or reject the RTS frame by verifying routing consistency conditions at the MAC sub-layer.

Duration: This field indicates a total expected time for exchanging data frame(s) specified in the RTS. The duration may include time to transmit the specified data frames, waiting times such inter-frame spacing (IFS) (e.g., SIFS, GIFS, etc.) between frames, and acknowledgment (ACK) or non-acknowledgement (NACK) responses. The duration field may be used to determine a duration that a node will be busy communicating with another node and therefore unavailable to receive.

Ch. On: This field includes a flag indicating whether the RTS includes a channels list.

Channels List: This field includes a channels list including a list of channels that are available to a node sending the RTS frame. A node receiving the RTS frame may select a channel from the available channels and specify this chosen channel inside a CTS frame. In some examples, the channel list may include less than all channels that are available to a node. For example, if a DSSS modulation is employed, the channel list may be limited to 13 channels in the 915 MHz Industrial, Scientific, and Medical (ISM) band. The channel list may comprise, for example, a list of qualified channels between the node that sent the RTS and the node that received the RTS. The list of qualified channels may be maintained in memory of the node that sent the RTS and/or the node that received the RTS.

Data Rate (DR) parameters: This field indicates a maximum data rate supported and/or proposed by a node sending the RTS frame. A node receiving the RTS frame may utilize this field to determine a data rate of which both the sending and receiving nodes are capable. The determined data rate may be sent to the sending node using a CTS frame. The determined data rate will be set to at most the maximum data rate of a slower of the two nodes. Thus, if the RTS proposes a data rate higher than the receiving node is capable of, the receiving node will set a lower data rate (at most the maximum data rate of the receiving node) when sending the CTS frame.

Data_ID: This field includes an ID of a data packet. This ID may be present inside the RTS frame. This field may be utilized if, for example, the data packet was received by a particular node but an acknowledgement was not received at a node which sent the data packet. In this case, the node which sent the data packet with Data_ID may assume that the data packet was not received and may reseed an RTS frame for the same Data_ID. In some cases, when the particular node keeps track of a number of last Data IDs received, the particular node may respond with an ACK frame instead of a CTS frame, and thus avoid a retransmission of the data packet.

F_ID: This field includes a MAC frame ID of the RTS frame and may be utilized to detect duplicate RTS frames. The receiving node of the RTS frame may copy this F_ID into the CTS frame when answering the RTS frame. When a node sending the RTS frame receives a CTS frame, the node may use the F_ID in the CTS frame to determine if the CTS frame is the expected frame (e.g., the CTS frame is an answer to the RTS frame the node sent previously).

NP: This field indicates a number of packets to be exchanged with a node receiving the RTS frame. This field tells the receiving node how many packets to listen for on a specified data channel before switching back to listen on the control channel. This field may also be useful in determining availability of articular channels.

Pre_Ch: This field indicates a channel that a node prefers to utilize for exchanging data frames. By default, the recipient of the RTS frame may select this channel for data exchange, if possible. However, if this channel is busy or is otherwise not available to the receiving node, the recipient node may designate a different channel in the CTS.

DIR: This field indicates whether traffic is from a root or is to be sent to the root. Traffic sent from a root toward a leaf is said to be "downstream," while all communications sent toward the root are said to be "upstream." The field may be set to 1 for upstream traffic and 0 for downstream traffic, for example.

FIG. 5, meanwhile, illustrates an example CTS message 500 in the form of a frame that may be communicated to indicate that a node is available to receive data. The CTS frame 500 may include, for example, PHY parameters and a data channel selected by the first node. In some instances, the CTS frame 500 is utilized to inform neighboring nodes that the node sending the RTS frame and the node sending the CTS frame will be unavailable and that the selected data channel will be busy during a specified time period. In the example of FIG. 5, the CTS frame 500 includes the following fields: FC, sequence number, destination PAN identifier, destination address, source PAN identifier, source address, auxiliary security header, payload, and FCS. Details of the foregoing fields of the CTS frame 500 other than the payload are well known to those skilled in the art and are not described in detail herein. The payload of the CTS frame 500, however, is customized to implement the techniques described above, as well as other functionalities. The payload of the CTS frame 500 may be variable in size and may include, for example, one or more of the following fields:

Type: This field may indicate information similar to that described above in reference to FIG. 4. In the example of FIG. 5, this field indicates that the frame is a CTS frame.

HW: This field includes hardware parameters (e.g., type of device, version or generation of device, etc.) of a node that received the RTS frame (i.e., the node that will send the CTS frame).

Rank: This field is analogous to the corresponding field of the RTS frame, but as applied to the CTS frame. This field may be used in ranking communication paths according to their relative quality.

DODAG_ID: This field is analogous to the corresponding field of the RTS frame, but as applied to the CTS frame. Specifically, this field is a DODAG identifier providing a choice for a node which receives the CTS frame to accept or reject by verifying routing consistency conditions at a MAC sub-layer.

Duration: This field is analogous to the corresponding field of the RTS frame, but as applied to the CTS frame, and may be used in determining availability and duration of availability.

Channel: This field indicates a data channel selected by the node that received the RTS frame.

DR: This field indicates a data rate selected by the node that received the RTS frame. The data rate may be the same (if the receiving node is capable of the data rate) or different than the data rate specified in the RTS (if the receiving node is not capable of the data rate specified in the RTS). This data rate may be implemented to transfer data on a data channel.

F_ID: This field includes a MAC frame ID of the CTS frame, which may be identical to a F_ID of an RTS frame.

In some instances, one or more of the above fields included within the RTS frame 400 of FIG. 4 and/or the CTS frame 500 of FIG. 5 may be utilized by one or more nodes to determine a particular data channel from multiple data channels, a modulation technique to be utilized on the particular data channel, and/or a data rate to be implemented on the particular data channel.

For instance, a first node may send an RTS frame to a second node requesting to transfer data with the second node. The RTS frame may include one or more of the fields noted above, such as HW, Ch. List, DR, and/or Pre CH. Based on one or more of these fields the second node may determine the particular data channel, modulation technique, and/or data rate. The second node may then send a CTS frame to the first node indicating the particular data channel, modulation technique, and/or data rate that have been selected to transfer data.

As discussed above, the RTS and CTS frames 400 and 500 are merely examples of some PDUs that may be used to implement the techniques described herein. In other embodiments various other PDUs may be employed to implement the described techniques.

Illustrative Processes

Figure 6:
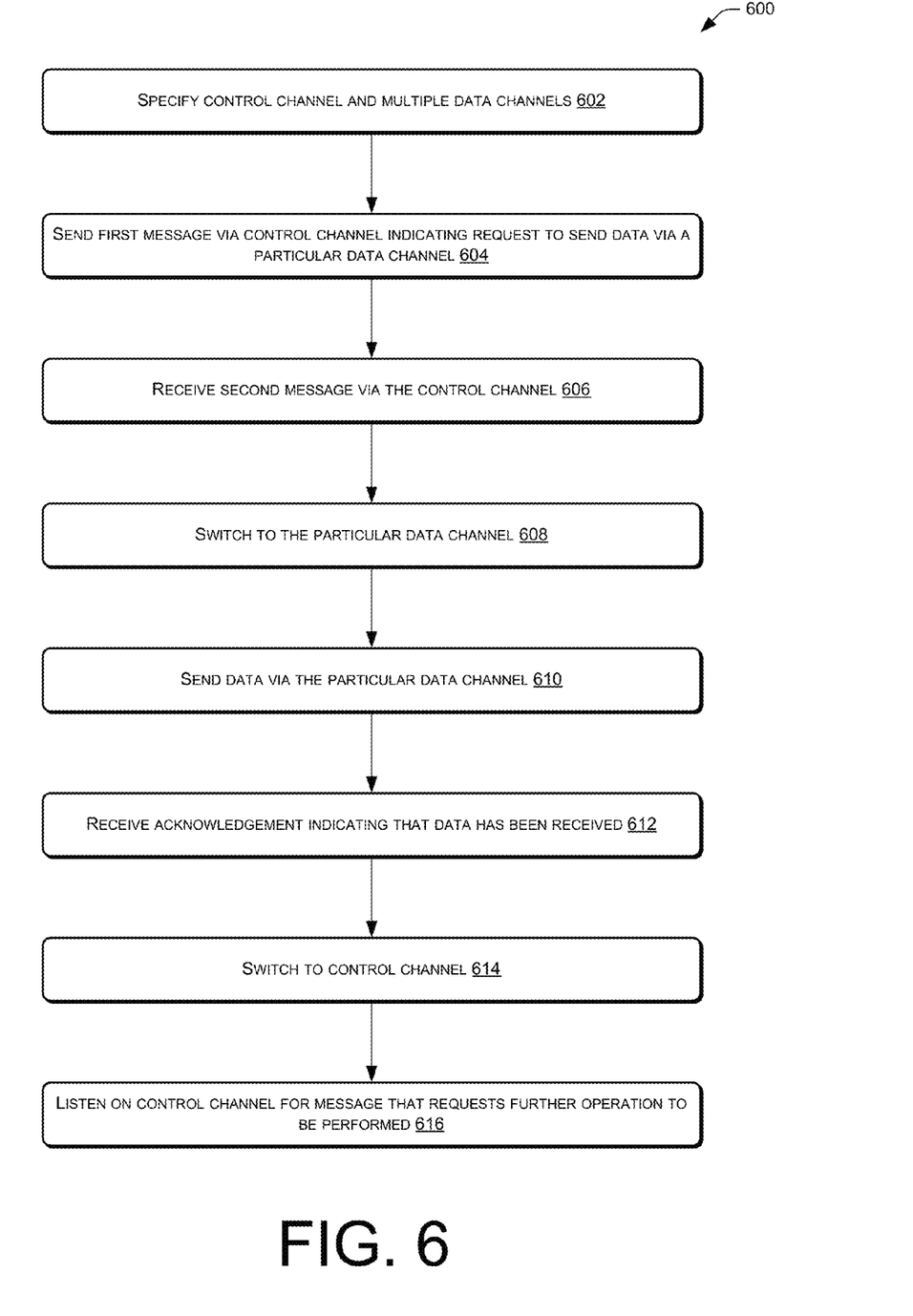
FIG. 6 illustrates an exemplary process of sending a first message via a control channel indicating a request to send data, receiving a second message indicating a particular data channel, and sending the data via the particular data channel.
Figure 7:
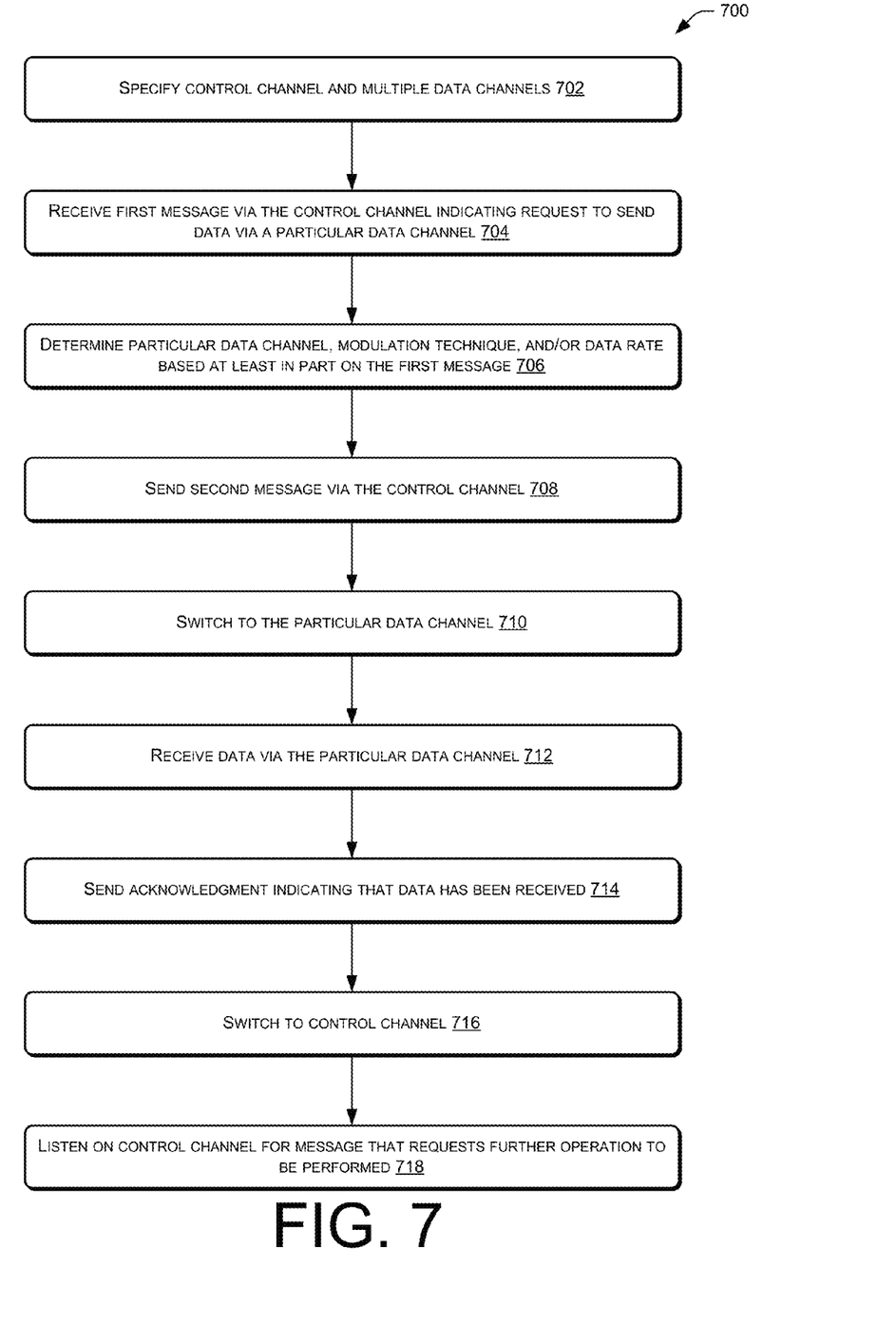
FIG. 7 illustrates an exemplary process of receiving a first message via a control channel indicating a request to send data, sending a second message via the control channel indicating a particular data channel that has been determined, and receiving data via the particular data channel.

FIGS. 6-7 illustrate exemplary processes 600 and 700 of communicating one or more messages via a control channel and transferring data via a particular data channel. The processes 600 and 700 (as well as each process described herein) are illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

In FIG. 6, the process 600 may be performed by a node that will send data (e.g., a data PDU). While in FIG. 7, the process 700 may be performed by a node that will receive the data. In FIGS. 6 and 7, the term "sending node" refers to the node that will send the data, and the term "receiving node" refers to the node that will receive the data during a given exchange of data. However it should be understood that every node can function as both a sending node and a receiving node as needed.

As illustrated in FIG. 6, the process 600 includes an operation 602 for specifying a control channel and multiple data channels from a plurality of channels. In some instances, the operation 602 is performed at a MAC sub-layer. The operation 600 also includes an operation 604 for sending a first message via the control channel indicating a request to send data. The first message may be sent to a receiving node.

The process 600 also includes an operation 606 for receiving a second message via the control channel. The second message may be received from the receiving node. In some instances, the second message indicates a particular data channel of the multiple data channels, a modulation technique to be utilized on the particular data channel, and/or a data rate of the particular data channel that was determined at the receiving node to transfer the data. The process 600 may then proceed to an operation 608 for switching to the particular data channel. The operation 608 may be performed based on the particular data channel that is indicated in the second message.

The process 600 also includes an operation 610 for sending the data via the particular data channel to, for example, the receiving node. In some instances, the data is sent based on the modulation technique and/or data rate indicated in the second message. The process 600 includes an operation 612 for receiving an acknowledgement indicating that the data has been received. The acknowledgement may be received from, for example, the receiving node.

The process 600 also includes an operation 614 for switching to the control channel. In some instances, the operation 614 is performed in response to receiving the acknowledgement, while in other instances the operation 614 is performed after a predetermined time period has expired. The process 600 includes an operation 616 for listening on the control channel for a message that requests a further operation to be performed by, for example, the sending node.

Meanwhile, the process 700 in FIG. 7 may be performed by a receiving node. The process 700 includes an operation 702 for specifying a control channel and multiple data channels from a plurality of channels. In some instances, the operation 702 is performed at a MAC sub-layer. The process 700 includes an operation 704 for receiving a first message via the control channel indicating a request to send data. The first message may be received from a sending node. Further, the process 700 includes an operation 706 for determining a particular data channel of the multiple data channels, a modulation technique to be utilized on the particular data channel, and/or a data rate of the particular data channel based at least in part on the first message. The process 700 includes an operation 708 for sending a second message via the control channel to, for example, the sending node. In some implementations, the second message specifies the particular data channel, modulation technique, and/or data rate determined in the operation 706.

The process 700 also includes an operation 710 for switching to the particular data channel determined in the operation 706. The operation 710 may be performed in response to sending the second message. The process 700 also includes an operation 712 for receiving the data via the particular data channel. In addition, the process 700 includes an operation 714 for sending an acknowledgement indicating that the data has been received. The operation 714 may be performed after the data has been received.

Moreover, the process 700 includes an operation 716 for switching to the control channel. The operation 716 may be performed in response to sending the acknowledgment. Alternatively, or additionally, the operation 716 may be performed after a predetermined time period has expired since the data, or a portion thereof, has been received and/or since switching to the particular data channel. Here, the expiration of the predetermined time period may be based on a timer. The process 700 includes an operation 718 for listening on the control channel for a message that requests a further operation to be performed by, for example, the receiving node.

CONCLUSION

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. A method, comprising:
communicating, between nodes of a network that include at least one different communication capability, one or more messages via a control channel, the at least one different communication capability being due to the nodes comprising different types of devices, different generations of devices, different versions of devices, and/or different models of devices, the one or more messages indicating a maximum data rate that is supported by at least one of the nodes, each of the nodes being associated with a utility meter;
determining, based at least in part on the communicating the one or more messages, a particular data channel from multiple data channels, the control channel and the multiple data channels being channels of the network;
determining a maximum common data rate that is supported by the nodes based at least in part on the one or more messages;
switching to the particular data channel based at least in part on the determining the particular data channel;
sending or receiving, by one of the nodes, data via the particular data channel at the maximum common data rate; and
switching to the control channel upon completion of sending or receiving the data via the particular data channel.

2. The method of claim 1, wherein the one or more messages identify the particular data channel, the modulation technique, and a number of data units that will be sent via the particular data channel.

3. The method of claim 1, further comprising:
sending or receiving an acknowledgment indicating that the data was received,
wherein the switching to the control channel includes switching to the control channel in response to sending or receiving the acknowledgement.

4. The method of claim 1, wherein:
the communicating the one or more messages includes sending a message indicating a request to send the data to a node of the nodes, and
the sending or receiving includes sending the data to the node via the particular data channel.

5. The method of claim 1, wherein:
the communicating the one or more messages includes receiving a message indicating a request to send the data to a node of the nodes, and
the sending or receiving includes receiving the data at the node via the particular data channel.

6. The method of claim 1, wherein the sending or receiving includes sending or receiving the data via the particular data channel between the nodes while other data is transferred between other nodes via another data channel of the multiple data channels.

7. The method of claim 1, further comprising:
determining a modulation technique to be utilized during the sending or receiving of the data based at least in part on a distance between the nodes.

8. The method of claim 1, further comprising:
frequency hopping the control channel over the plurality of channels based on a frequency hopping sequence.

9. The method of claim 1, wherein the one or more messages communicated via the control channel are each smaller in data size than the data sent or received via the particular data channel.

10. The method of claim 1, wherein:
the communicating the one or more messages includes communicating the one or more messages via the control channel at a data rate that is less than the maximum common data rate.

11. A system, comprising:
a single radio frequency (RF) transceiver configured to implement a plurality of different modulation techniques and/or data rates;
one or more processors; and
memory storing operational logic which when executed causes the one or more processors to perform acts including:
causing a message to be received by the single RF transceiver via a control channel, the message being received from a node that is associated with a utility meter and specifying a type of the node, a version of the node, a generation of the node, and/or a model of the node, the message indicating a number of data units that will be sent and a maximum data rate that is supported by the node,
determining a particular data channel from multiple data channels, the control channel and the multiple data channels being channels on a same network,
determining, based at least in part on the message, a maximum common data rate that is supported by the node and the system,
causing switching to the particular data channel based at least in part on the determining the particular data channel,
causing the data units to be received by the single RF transceiver via the particular data channel at the maximum common data rate, and
causing switching to the control channel after the data units have been received.

12. The system of claim 11, wherein the data units are received via the particular data channel while one or more other data units are received at another node via another data channel of the multiple data channels.

13. The system of claim 11, wherein the message includes less bits and/or bytes than at least one of the data units.

14. The system of claim 11, wherein:
the message is received via the control channel at a data rate that is less than the maximum common data rate.

15. One or more non-transitory computer-readable media storing computer-executable instructions that, when executed by one or more processors of one of the nodes, cause the one or more processors to perform the method of claim 1.

16. A system, comprising:
a single radio frequency (RF) transceiver configured to implement a plurality of different modulation techniques and/or data rates;
one or more processors; and
memory storing operational logic which when executed causes the one or more processors to perform the method of claim 1 at least in part using the single RF transceiver.

17. One or more non-transitory computer-readable media storing computer-executable instructions that, when executed by one or more processors of a node, cause the one or more processors to perform operations comprising:
- sending a message via a control channel to another node, the message specifying a maximum data rate that is supported by the node that is due to a type of the node, a generation of the node, a version of the node, and/or a model of the node, at least one of the node or the other node being associated with a utility meter;
- receiving another message via the control channel from the other node indicating that the message was received by the other node, the message and/or the other message specifying a data channel from among a plurality of data channels, the other message specifying a maximum common data rate that is supported by the node and the other node to be used for communicating via the data channel;
- in response to receiving the other message, switching to the data channel;
- sending data via the data channel to the other node at the maximum common data rate; and
- switching to the control channel upon completion of sending the data via the data channel.

18. The one or more non-transitory computer-readable media of claim 17, wherein the sending the message comprises:
- sending the message a first time via the control channel based at least in part on a first modulation technique; and
- sending the message a second time via the control channel based at least in part on a second modulation technique when a response to the message sent the first time is not received within a predetermined time period, the second modulation technique being different than the first modulation technique.

19. The one or more non-transitory computer-readable media of claim 17, wherein the message is sent via the control channel at a data rate that is less than the maximum common data rate.

20. The one or more non-transitory computer-readable media of claim 17, wherein the message includes a customized payload portion that specifies the maximum data rate that is supported by the node.

* * * * *